United States Patent Office 3,682,709
Patented Aug. 8, 1972

3,682,709
PROCESS FOR IMPROVING NICKEL BASE, NON-NOBLE METAL FUEL CELL CATALYSTS
Dirk Pouli, Milwaukee, Wis., and Theodore L. Larson, Longmont, Colo., assignors to Allis-Chalmers Manufacturing Company, Milwaukee, Wis.
No Drawing. Filed Dec. 4, 1967, Ser. No. 687,449
Int. Cl. C21d 1/74; H01m 13/04; B01j 11/22
U.S. Cl. 148—20.3
10 Claims

ABSTRACT OF THE DISCLOSURE

A heat treating process for improving the performance and life characteristics of nickel base, nonnoble metal fuel cell anode catalysts wherein the catalyst after synthesis is stored under water. The wet material is then heated in an inert atmosphere containing at least 5 mole percent water vapor for a period of about one hour, and at a temperature of from 250 to 700° C.

BACKGROUND OF THE INVENTION

This invention relates generally to fuel cell anode catalysts. More specifically, this invention relates to a heat treating process for improving the performance and life characteristics of nickel base, nonnoble metal anode catalysts.

The term fuel cell, as used herein, refers to those electrochemical devices that convert the free energy of a chemical reaction directly to electrical energy. Such devices are well known in the art and although there are differences between various cells, a discussion of some of their common characteristics will aid in the understanding of our invention.

As is known, oxidation-reduction reactions are accompanied by the transfer of electrons from the reductant to the oxidant. In individual fuel cells, the oxidation reaction and reduction reaction take place at spacially separated electrodes. At each electrode there occurs what is called a half-cell reaction. One electrode, called the anode, is the site of the oxidation half-cell reaction. A reactant, referred to as the fuel that is oxidizable with respect to some oxidant is supplied by suitable means to the anode, and is thereat electrochemically oxidized. Oxidation of the fuel releases electrons to the anode. At the other electrode, called the cathode, spaced apart from the anode by a suitable electrolyte, the other half-cell reaction simultaneously takes place. A reactant called the oxidant, reducible with respect to the fuel, is supplied by suitable means to the cathode, and is thereat electrochemically reduced. This reaction takes up electrons from the cathode.

These two half-cell reactions result in the cathode tending to have a deficiency of electrons and the anode to have an excess. This tendency is relieved by the transfer of charge electronically through an external circuit connecting the electrodes, accompanied by the ionic transfer of charge through electrolyte. The current produced in the external circuit can do useful work. Production of current will continue so long as fuel and oxidant are supplied and waste products exhausted.

The voltage of the individual fuel cell is limited by the theoretical free energy change ($\Delta F$) for the reaction at the fuel cell operating temperature. The amperage of the cell is determined by the rate of reaction and the size of the cell. In practice, several individual fuel cells are coupled in cooperative electrical connection to obtain the desired output. A plurality of cells so connected is known as a module.

Although the reaction between oxidant and fuel is thermodynamically spontaneous, the respective reactants must attain an activated state before they can react. The energy input required to reach an activated state, i.e., heat of activation, partly determines the speed of reaction. The greater the energy that is required for activation, the fewer are the molecules possessing this energy at a given temperature, and the slower is the reaction.

In the past, to speed reaction, an external heat source was used to heat fuel cell reactants and thereby activate them. More recently, catalysts have been employed to increase reaction rate. Through a mechanistic bypass a catalyst brings about reaction with a smaller heat of activation. Catalysts have made possible the operation of so called low temperature fuel cells (about 25° to about 150° C.) without a lessening in cell output compared to cells operating at higher temperature. It follows that with more efficient catalysts, the activation energy can be decreased and greater cell outputs attained at a given voltage and temperature.

Although the most efficient anode catalysts have been noble metals such as platinum and palladium, significant advances have been made in nonnoble metal catalysts, particularly those basically having a nickel composition. Some nickel alloys have been shown to have performance and life characteristics approaching the noble metals. In view of the obvious economies, the nickel base, nonnoble metal anode catalysts appear most promising for commercial applications.

SUMMARY OF THE INVENTION

This invention is predicated upon our discovery of a heat treating technique whereby the performance and life characteristics of nickel base, nonnoble metal anode catalysts can be substantially enhanced to match or even exceed the like characteristics of noble metal anode catalysts. The process simply comprises keeping the catalyst out of contact with oxidizing environments from the time it is synthesized until it is heat treated, and then heat treating the catalyst in a moisture containing inert atmosphere.

Accordingly, it is the primary object of this invention to provide a process for heat treating nickel base, nonnoble metal anode catalysts to improve the performance and life characteristics thereof.

This and other objects and advantages are fulfilled by this invention as will become apparent from an understanding of the following detailed description.

DESCRIPTION OF THE PREFERRED EMBODIMENTS

Although any nonnoble metal catalyst, which is basically nickel, will benefit from this heat treating technique, we have found that the best results are obtained by using the high surface area nickel or nickel alloy powders which are currently emerging as superior types of anode catalysts.

The process, to be effective, must be performed on fresh catalyst which has not been previously used or exposed to the atmosphere. That is to say, fresh catalyst must first be synthesized and then protected from oxidizing environments until after the catalyst has been heat treated. Although any technique for protecting the catalyst from air or other oxidizing environments will suffice, we have preferred to keep the catalyst under water. Specifically, we synthesize the catalyst by precipitating it from an aqueous nickel solution, wash the fresh catalyst with water, and then keep it stored under water until the heat treatment is commenced. Excessive storage durations under water do not seem to affect the catalyst since we have had equally good results with fresh catalysts and catalysts which have been stored under water for months. Hence, the only critical factor prior to heat treatment is that the catalyst must at all times be protected from air or other oxidizing environments from the time it is synthesized until after it is heat treated.

The heat treatment itself merely comprises heating the wet catalyst in a moisturized nonoxidizing atmosphere at a temperature of from 250° C. to about 700° C. for a period of at least 5 minutes. After the catalyst has been so heat treated, it may then be exposed to air without harmful effects.

The most important factor is that the furnace atmosphere must be inert, or at least nonoxidizing and that it must contain at least 5 mole percent water, or more specifically, steam. If an oxidizing atmosphere is used, or if the steam is not used in sufficient quantity, the desired improvements in performance and life characteristics will not be effected. Although improved results can be obtained with steam concentrations as low as 5 mole percent, as indicated above, optimum results can be achieved only at steam concentrations above about 70 mole percent. There is no critical upper limit for steam content as pure steam will effect the desired results.

Although noticeable improvements in catalyst performance and life characteristics can be effected at heat treating temperatures as low as 250° C., we have preferred to use temperatures of from 300 to 500° C. or higher. This is because the degree of improvement in performance is frequently proportional to the temperature used. Therefore, the critical lower temperature limit is at about 250° C. while the upper temperature limit should be determined by the operators objectives and the nature of the catalyst itself. That is to say, any temperature above 250° C. may be used, provided the temperature is not so excessive as to destroy the desired physical characteristics of the final product. For example, if a powder is treated, and it is desired that the catalyst remain in powder form, then obviously temperatures above about 700° C. should be avoided as the catalyst may melt or become sintered into a malleable mass. For this reason, we have preferred to use temperatures below 700° C. As would be expected, however, some sintering will, of course, result at temperatures below 700° C. But so long as the sintering is not severe and the sintered mass can easily be pulverized back into powder form, such slight sintering must be tolerated.

The heat treating time is not critical. Although for experimental purposes, we have preferred to maintain the catalyst at the predetermined temperature for periods of from one-half to one hour, 5 minutes of heating at the desired temperature is all that is usually necessary to gain an improved catalyst. This, of course, is exclusive of the time required to raise the catalyst to the desired temperature. Nevertheless, if catalyst characteristics are to be optimized, holding times of about one hour are preferred.

After the catalyst has been heat treated as described above, it may be cooled and applied as desired. It is preferred, however, that the catalyst be permitted to cool while in the inert atmosphere. Some high surface area nickel powders may burn up if exposed to air while heated to temperatures of about 500° C. or better.

Although we have been unable to explain the reasons for the improvement in the catalyst's performance and life characteristics, we have noted that the heat treatment is always accompanied by a reduction in the catalyst's surface area. This, however, does not explain the improvement as the exact opposite would be expected. That is, it is well accepted that performance characteristics will be enhanced by increasing the catalyst's surface area.

The following examples are presented to illustrate detailed procedures for the practice of this invention. These examples are merely illustrative of some of the procedures we used and hence the invention should not be limited thereto.

EXAMPLE I

A given quantity of high surface area nickel powder was deposited electrolytically from an aqueous electrolyte. A portion thereof was washed with water and then placed under water for storage purposes, while another portion was dried and fabricated into a 3" x 3" electrode using 7.5 grams of catalyst. Using this electrode as the anode and a high surface area silver cathode, a cell was constructed using a 30 percent KOH electrolyte in a 0.030" asbestos matrix. Hydrogen was applied as a fuel and oxygen as the oxidant each at 18 p.s.i.g. The following performance was recorded:

| Voltage: | A.s.f. |
|---|---|
| 0.957 | 50 |
| 0.900 | 100 |
| 0.815 | 200 |
| 0.750 | 300 |

Several portions of the catalyst stored under water were subsequently heat treated at various temperatures of from 300 to 500° C. as follows:

A portion of the wet catalyst was placed into an 8" quartz boat, and while still wet, placed into a resistance wound tube type furnace. An 8" Pyrex boat containing water was also placed into the furnace at a point where the water would be heated to boiling but not heated as high as the catalyst. An inert gas was then caused to flow through the tube of the furnace first passing over the boiling water and then over the wet catalyst. Calculations showed that this furnace gas comprised about 85 percent steam by volume. The furnace was then started and the catalyst heated to a predetermined temperature. After one hour, the furnace was shut off and the catalyst pulled partially out so that it could cool while still in the inert gas stream. When cooled, the catalyst was formed into a fuel cell anode and tested under conditions identical to those noted above for the nonheat treated catalyst. The following recorded results were typical:

| Catalyst | Voltage, a.s.f. at— | | | |
|---|---|---|---|---|
| | 50 | 100 | 200 | 300 |
| H. T. at: | | | | |
| 300° C | 0.980 | 0.935 | 0.865 | 0.820 |
| 400° C | 0.980 | 0.935 | 0.863 | 0.807 |
| 500° C | 0.962 | 0.910 | 0.827 | 0.760 |

EXAMPLE II

A nickel phosphorus alloy catalyst containing boron and molybdenum was synthesized by precipitating the catalyst in an aqueous solution. After the catalyst was washed, a portion was air dried and another portion was stored under water. Each portion was then tested in a procedure identical to that followed in Example I. The following recorded results were typical:

| Catalyst | Voltage, a.s.f. at— | | | |
|---|---|---|---|---|
| | 50 | 100 | 200 | 300 |
| Air dried | 0.85 | 0.75 | 0.60 | 0.50 |
| H. T. at 400° C | 1.005 | 0.965 | 0.885 | 0.820 |

EXAMPLE III

An improved form of the nickel phosphorus alloy catalyst of Example II was tested in a procedure identical to that of Examples I and II. The following recorded results were typical:

| Catalyst | Voltage, a.s.f. at— | | | |
|---|---|---|---|---|
| | 50 | 100 | 200 | 300 |
| Air dried | 0.94 | 0.855 | 0.72 | 0.64 |
| H. T. at 400° C | 0.988 | 0.948 | 0.867 | 0.800 |

EXAMPLE IV

Ranel nickel was tested in a procedure substantially identical to that of the previous examples. The following recorded results were typical:

| Catalyst | Voltage, a.s.f. at— | | | |
|---|---|---|---|---|
|  | 50 | 100 | 200 | 300 |
| Air dried | 0.88 | 0.75 | 0.48 | 0.25 |
| H. T. at 525° C | 0.995 | 0.945 | 0.860 | 0.790 |

It should be pointed out that the contrast between the air dried catalyst and the catalyst heat treated in accordance with this invention is even more remarkable at current densities above 300 a.s.f. For comparison purposes, however, 300 a.s.f. is the top current density limit because the voltage usually drops to zero at 400 a.s.f. for the air dried catalyst. On the other hand, the heat treated catalysts will typically maintain voltages into the 800 to 1,000 a.s.f. range.

A comparison of the life characteristics is also remarkable. The typical air dried catalyst has a life of from 500–1,000 hours. The typical heat treated catalyst, on the other hand, has a life of about 4,500 hours.

The embodiments of the invention in which an exclusive property or privilege is claimed are defined as follows:

1. A process for improving the level of catalytic activity of a non-noble metal fuel cell, electrocatalyst having nickel as a principal catalytic constituent for increased voltage output and life and for providing a catalyst which is stable in air, which compises the steps of heat treating a given quantity of material comprised of nickel which has a certain level of catalytic activity prior to said heat treating but which given quantity of material has been substantially unused as a catalyst, and which given quantity of material has never been subjected to an oxidizing environment, said heat treating being conducted at a temperature of at least 250° C. for a period of at least 5 minutes in a nonoxidizing atmosphere containing at least 5 mole percent steam, and cooling the material after the completion of the heat treatment for increasing the catalytic activity thereof above said certain level.

2. A process according to claim 1 wherein said material is cooled in a nonoxidizing atmosphere.

3. A process according to claim 1 wherein said nonoxidizing atmosphere contains at least about 70 mole percent steam.

4. A process according to claim 1 wherein said material is protected from oxidizing environments by storing the material under water until said heat treating is commenced.

5. A process according to claim 1 wherein said heat treating temperature is within a range of from 250 to 700° C.

6. A process according to claim 1 wherein said material is in powder form.

7. A process according to claim 1 wherein said material is a high surface area nickel powder.

8. A process according to claim 1 wherein said material is of the Raney nickel type.

9. A process according to claim 1 wherein said material is a nickel alloy containing at least one of the elements phosphorus, boron, molybdenum.

10. A process according to claim 1 in which the heat treatment continues for about one hour.

References Cited

UNITED STATES PATENTS

| | | | |
|---|---|---|---|
| 2,139,602 | 12/1938 | Raney | 252—477 Q |
| 3,525,702 | 8/1970 | Von Strum et al. | 136—120 FC |
| 1,915,473 | 6/1933 | Raney | 252—477 R |
| 2,388,959 | 11/1945 | Drew | 252—477 R |
| 2,461,396 | 2/1949 | Raney | 252—477 R |
| 3,201,282 | 8/1965 | Justi et al. | 136—86 |

FOREIGN PATENTS

| | | | |
|---|---|---|---|
| 701,228 | 12/1953 | Great Britain | 252—476 |

WINSTON A. DOUGLAS, Primary Examiner

M. J. ANDREWS, Assistant Examiner

U.S. Cl. X.R.

136—120 FC; 252—477 Q